United States Patent
Eo et al.

(10) Patent No.: US 11,480,232 B2
(45) Date of Patent: Oct. 25, 2022

(54) DUAL CLUTCH TRANSMISSION

(71) Applicants: Hyundai Motor Company, Seoul (KR); Kia Motors Corporation, Seoul (KR)

(72) Inventors: Soon Ki Eo, Ansan-si (KR); Dong Woo Kim, Incheon (KR); Min Ho Chae, Incheon (KR); Il Han Yoo, Hwaseong-si (KR); Chon Ok Kim, Yongin-si (KR); Marcus Meyer, Chemnitz (DE); Mirko Leesch, Gelenau (DE); Erik Schreiterer, Chemnitz (DE); Rico Resch, Chemnitz (DE); Matthias Hoehne, Dresdan (DE); Joerg Mueller, Chemnitz (DE)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 184 days.

(21) Appl. No.: 17/038,418

(22) Filed: Sep. 30, 2020

(65) Prior Publication Data

US 2021/0310541 A1 Oct. 7, 2021

(30) Foreign Application Priority Data

Apr. 7, 2020 (KR) .......................... 10-2020-0042152

(51) Int. Cl.
*F16H 3/00* (2006.01)
*F16H 3/093* (2006.01)

(52) U.S. Cl.
CPC ............ *F16H 3/006* (2013.01); *F16H 3/093* (2013.01); *F16H 2200/0052* (2013.01)

(58) Field of Classification Search
CPC .. F16H 3/006; F16H 3/093; F16H 2200/0052; F16H 2003/0807; F16H 2003/0826; F16H 2003/0931; F16H 3/12; F16H 3/085; F16H 3/38; F16H 2003/0938
See application file for complete search history.

(56) References Cited

U.S. PATENT DOCUMENTS 7,621,195 B2 * 11/2009 Hattori .................... F16H 3/093
74/330

FOREIGN PATENT DOCUMENTS

KR       10-2019-0065668 A       6/2019

* cited by examiner

Primary Examiner — Victor L Macarthur
(74) Attorney, Agent, or Firm — Morgan, Lewis & Bockius LLP

(57) ABSTRACT

A dual clutch transmission may include a first input shaft, a second input shaft, a first output shaft and a second output shaft; a first gear constrained to the first input shaft; a second gear and a third gear constrained to the second input shaft; a fourth gear provided to constrain the rotation to the second input shaft; a fifth gear which is engaged with the third gear; a sixth gear which is gear-engaged with the fourth gear; a seventh gear which is engaged with the first gear; an eighth gear which is gear-engaged with the second gear; and a ninth gear which is gear-engaged with the fourth gear.

16 Claims, 11 Drawing Sheets

FIG. 9

| ITEMS | CLUTCH | | SYNCHRONIZING DEVICE | | | | | | |
|---|---|---|---|---|---|---|---|---|---|
| | CL1 | CL2 | S1 | S2 | S3 | S4 | S5 | S6 | S7 |
| FIRST STAGE | ● | | | ● | | | ● | | |
| SECOND STAGE | | ● | | ● | | | | | |
| THIRD STAGE | ● | | | | ● | | | ● | |
| FOURTH STAGE | | ● | ● | | ● | | | | |
| FIFTH STAGE | ● | | | | | ● | | | |
| SIXTH STAGE | | ● | ● | | | ● | | ● | |
| R STAGE | ● | | | | | | ● | ● | |

FIG. 10

| ITEMS | FIRST STAGE | THIRD STAGE | FIFTH STAGE |
|---|---|---|---|
| SECOND STAGE | ● | ● | ● |
| FOURTH STAGE | | ● | ● |
| SIXTH STAGE | | | ● |
| R STAGE | | | |

DUAL CLUTCH TRANSMISSION

CROSS REFERENCE TO RELATED APPLICATION

The present application claims priority to Korean Patent Application No. 10-2020-0042152 filed on Apr. 7, 2020, the entire contents of which is incorporated herein for all purposes by this reference.

BACKGROUND OF THE PRESENT INVENTION

Field of the Invention

The present invention relates to a dual clutch transmission mounted in a vehicle.

Description of Related Art

A dual clutch transmission (DCT) has excellent power transfer efficiency and excellent shift quality.

Meanwhile, a transmission of a vehicle may implement the operation point of an engine more ideally as it provides a large number of shifting stages, improving fuel efficiency of the vehicle.

However, the transmission tends to increase in the whole length (length) as it implements a large number of shifting stages, resulting in poor vehicle mountability, and a front engine front drive (FF) vehicle has a very narrow space which the transmission may occupy, and thus the transmission may not be mounted in the vehicle.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a dual clutch transmission, which may implement a large number of shifting stages, improving fuel efficiency of a vehicle, and also configure the whole length of a transmission relatively shortly, securing excellent vehicle mountability.

A dual clutch transmission according to various exemplary embodiments of the present invention for achieving the object is configured to include: a first input shaft and a second input shaft which are concentrically mounted to each other; a first output shaft and a second output shaft which are mounted parallel with the first input shaft, and have output gears which are engaged with a ring gear of a differential, respectively; a first gear, rotation of which is constrained to the first input shaft; a second gear and a third gear, rotations of which are constrained to the second input shaft; a fourth gear, a rotation of which is selectively constrained to the second input shaft; a fifth gear gear-engaged with the third gear, wherein a rotation of the fifth gear is selectively constrained to the first output shaft; a sixth gear gear-engaged with the fourth gear, wherein a rotation of the sixth gear is selectively constrained to the first output shaft; a seventh gear gear-engaged with the first gear, wherein a rotation of the seventh gear is constrained to the second output shaft; an eighth gear which is gear-engaged with the second gear, provided to be rotatable about the second output shaft, and configured to be connected to the seventh gear; and a ninth gear which is gear-engaged with the fourth gear, provided to be rotatable about the second output shaft, and configured to be connected to the seventh gear.

The second input shaft may be formed of a hollow shaft surrounding the first input shaft, and the first gear, the second gear, the third gear and the fourth gear may be mounted sequentially along the axial direction thereof.

The second input shaft may be provided with a first synchronizer which may constrain the rotation of the fourth gear to the second input shaft.

The first output shaft may be provided with a second synchronizer which may constrain the rotation of the fifth gear to the first output shaft, and a third synchronizer which may constrain the rotation of the sixth gear to the first output shaft, and the sixth gear may be positioned between the second synchronizer and the third synchronizer.

The second output shaft may be provided with a fourth synchronizer which may constrain the seventh gear to the second output shaft, a fifth synchronizer which may connect the eighth gear to the seventh gear may be provided between the eighth gear and the ninth gear, and a sixth synchronizer which may connect the ninth gear to the seventh gear may be provided between the fifth synchronizer and the ninth gear.

The eighth gear and the ninth gear may be rotatably mounted to the outside of the hollow shaft which connects between the seventh gear and the fourth synchronizer.

The dual clutch transmission may further include a third output shaft which is mounted parallel with the first input shaft, and has a third output shaft which is engaged with the ring gear of the differential, a tenth gear whose rotation is constrained to the fifth gear may be provided between the fifth gear and the second synchronizer, and the third output shaft may be provided with an eleventh gear which is gear-engaged with the tenth gear and whose rotation may be constrained to the third output shaft.

The third output shaft may be provided with a seventh synchronizer which may constrain the rotation of the eleventh gear to the third output shaft and a parking gear.

The dual clutch transmission may be configured to implement all of the shifting stages having forward six stages and reverse one stage, by having only a total of six gear columns which are spaces in which the gears, which are engaged with each other vertically to the axial direction thereof, occupy along the axial direction thereof, and additionally having only a total of two sleeve columns which are spaces in which the synchronizers occupy along the axial direction thereof, in addition to the spaces in which the gear columns occupy along the axial direction thereof.

The present invention may implement a large number of shifting stages, improving fuel efficiency of a vehicle, and also configure the whole length of a transmission relatively shortly, securing excellent vehicle mountability.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 9 is an operation table for the transmission of FIG. 1 to implement each shifting stage.

FIG. 10 is a shift table of the transmission of FIG. 1.

Figure 1:
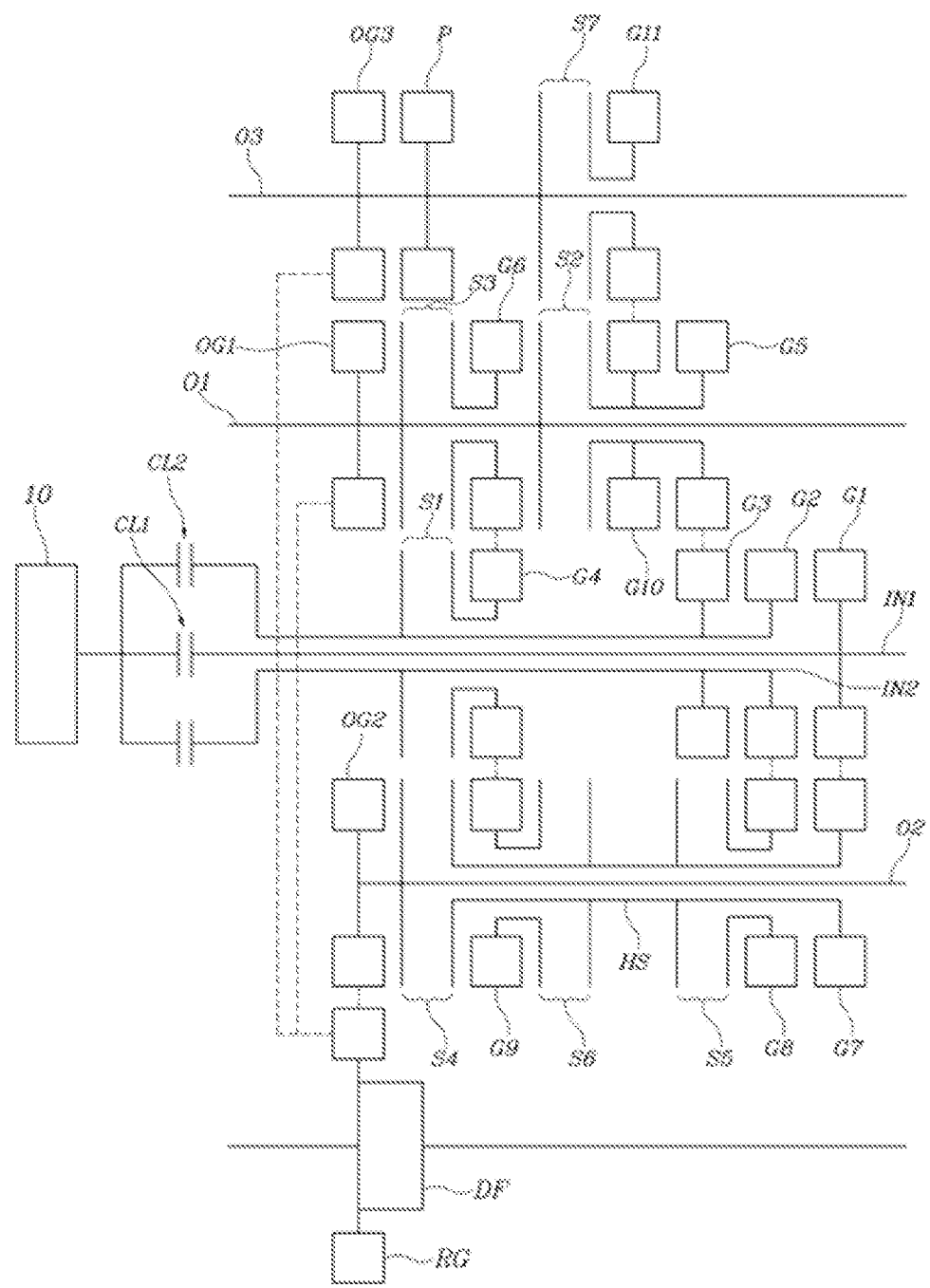
FIG. 1 is a diagram illustrating various exemplary embodiments of a dual clutch transmission according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Figure 11:
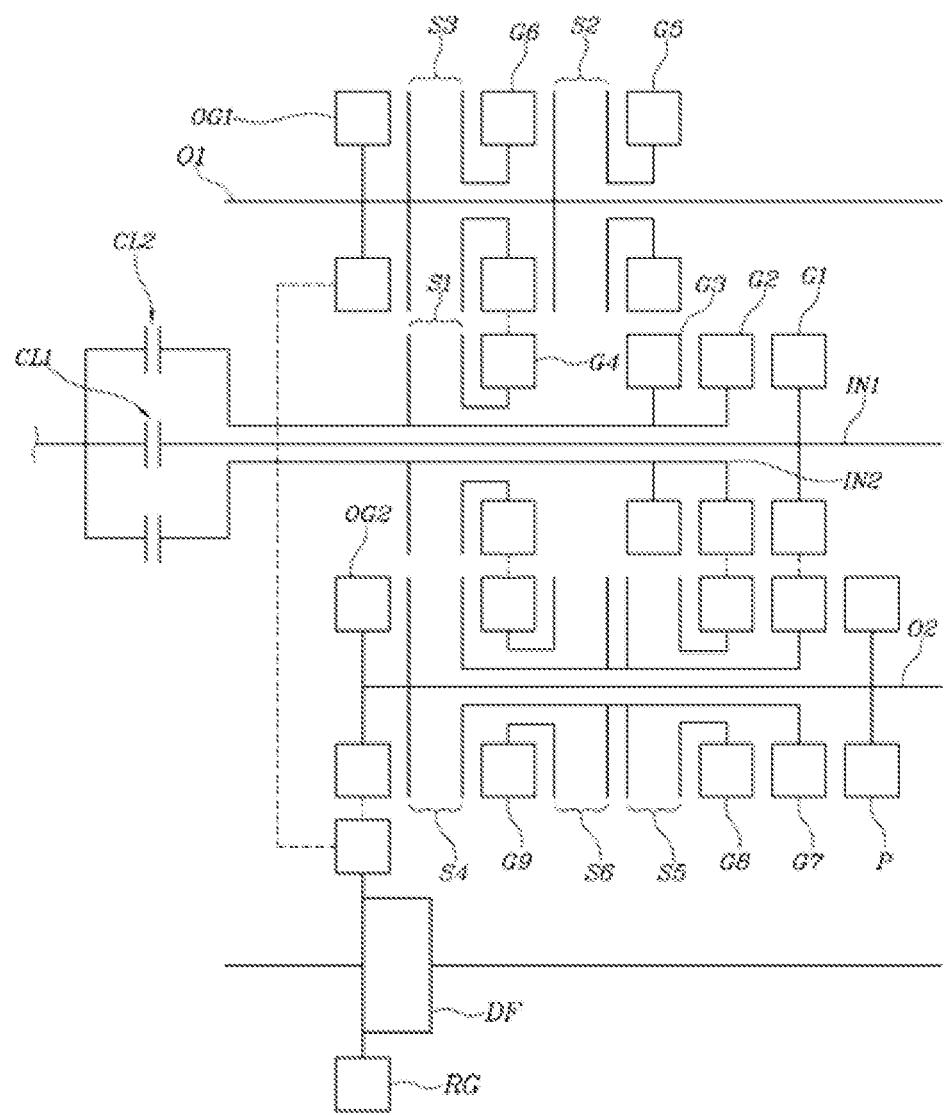
FIG. 11 is a diagram illustrating various exemplary embodiments of the dual clutch transmission according to various exemplary embodiments of the present invention.

Referring to FIGS. 1 and 11, various exemplary embodiments of a dual clutch transmission are commonly configured to include a first input shaft IN1 and a second input shaft IN2 which are mounted concentrically; a first output shaft O1 and a second output shaft O2 which are mounted parallel with the first input shaft IN1, and have output gears engaged with a ring gear RG of a differential DF, respectively; a first gear G1 whose rotation is constrained to the first input shaft IN1; a second gear G2 and a third gear G3 whose rotations are constrained to the second input shaft IN2; a fourth gear G4 which is provided to constrain rotation to the second input shaft IN2; a fifth gear G5 which is engaged with the third gear G3 and provided to constrain rotation to the first output shaft O1; a sixth gear G6 which is engaged with the fourth gear G4 and provided to constrain rotation to the first output shaft O1; a seventh gear G7 which is engaged with the first gear G1 and provided to constrain rotation to the second output shaft O2; an eighth gear G8 which is engaged with the second gear G2, provided to be rotatable about the second output shaft O2, and configured to be connected to the seventh gear G7; and a ninth gear G9 which is engaged with the fourth gear G4, provided to be rotatable about the second output shaft O2, and configured to be connected to the seventh gear G7.

That is, various exemplary embodiments of the present invention are configured to include the first input shaft IN1 and the second input shaft IN2 which receive power from a power source 10, such as an engine or a motor, respectively, and the first output shaft O1 and the second output shaft O2 which are mounted in parallel to the first input shaft IN1 and the second input shaft IN2, and to include the first gear G1 to the ninth gear G9.

Here, the first input shaft IN1 is mounted to receive power through a first clutch CL1, and the second input shaft IN2 is mounted to receive power through a second clutch CL2.

The first output shaft O1 is engaged with the ring gear RG of the differential DF through a first output gear OG1, and the second output shaft O2 is engaged with the ring gear RG of the differential DF through a second output gear OG2.

For reference, here, the "axial direction" refers to the longitudinal direction of each of the first input shaft IN1, the second input shaft IN2, the first output shaft O1, and the second output shaft O2, and since all of them are mounted in parallel to each other, all of them mean having the same directions.

The second input shaft IN2 is formed of a hollow shaft surrounding the first input shaft IN1, and the first gear G1 to the fourth gear G4 have structures which are mounted sequentially along the axial direction thereof.

The first input shaft IN1 is mounted with the first gear G1 in a rotation-constrained state, and the second input shaft IN2 is provided with a first synchronizer S1 which may constrain the rotation of the fourth gear G4 to the second input shaft IN2.

For reference, here, the "synchronizer" conventionally refers to a device including a sleeve which is provided to couple or release a hub rotating integrally with the shaft and a clutch gear rotatably mounted relative to the shaft by axially sliding between the hub and the clutch gear, and also includes a synchronizer ring which performs a synchronizing operation according to the movement of the sleeve.

However, recently, there is also a case of performing the synchronizing operation by an active and precise control of a motor without a separate synchronizer ring in hybrid vehicles, electric vehicles, or the like such that considering that the present invention may also be applied to such vehicles, it may be construed that the "synchronizer" in various exemplary embodiments of the present invention does not necessarily refer to only a device including the synchronizer ring.

In the drawing, the synchronizer is represented by two straight lines vertically adjacent to the axial direction thereof. Each of the two straight lines may be regarded as representing a conventional hub and clutch gear, and the drawing may be understood as simply representing a configuration in which the sleeve is axially and slidably mounted to any one of the hub and the clutch gear to be coupled to the other.

The first output shaft O1 is provided with a second synchronizer S2 which may constrain the rotation of the fifth gear G5 to the first output shaft O1, and a third synchronizer S3 which may constrain the rotation of the sixth gear G6 to the first output shaft O1, and the sixth gear G6 is positioned between the second synchronizer S2 and the third synchronizer S3.

The second output shaft O2 is provided with a fourth synchronizer S4 which may constrain the seventh gear G7 to the second output shaft O2; a fifth synchronizer S5 which may connect the eighth gear G8 to the seventh gear G7 is provided between the eighth gear G8 and the ninth gear G9; and a sixth synchronizer S6 which may connect the ninth gear G9 to the seventh gear G7 is provided between the fifth synchronizer S5 and the ninth gear G9.

The eighth gear G8 and the ninth gear G9 are components which are rotatably mounted to the outside of a hollow shaft HS which connects between the seventh gear G7 and the fourth synchronizer S4.

The aforementioned description is a configuration which is common to the various exemplary embodiments in FIG. 1 and the various exemplary embodiments of the present invention in FIG. 11.

The various exemplary embodiments in FIG. 1 further includes a third output shaft O3 which is mounted in parallel to the first input shaft IN1, and has a third output gear OG3 which is engaged with the ring gear RG of the differential DF; a tenth gear G10 whose rotation is constrained to the fifth gear G5 is provided between the fifth gear G5 and the second synchronizer S2; and the third output shaft O3 is provided with an eleventh gear G11 which is engaged with the tenth gear G10 and whose rotation may be constrained to the third output shaft O3 to implement a R stage which is a reverse stage.

The third output shaft O3 is provided with a seventh synchronizer S7 which may constrain the rotation of the eleventh gear G11 to the third output shaft O3 and a parking gear P.

On the other hand, the various exemplary embodiments in FIG. 11 does not have devices for implementing the aforementioned third output shaft O3 and the R stage using the same, and configures a transmission having a simpler configuration which may be mounted to the hybrid vehicle, the electric vehicle, or the like.

In the instant case, in a state in which the first stage is formed by the transmission, the R stage may be implemented by a method for reversely rotating the motor of the hybrid vehicle or the electric vehicle.

For reference, in the various exemplary embodiments in FIG. 11, the parking gear P is mounted on the second output shaft O2.

Figure 12:
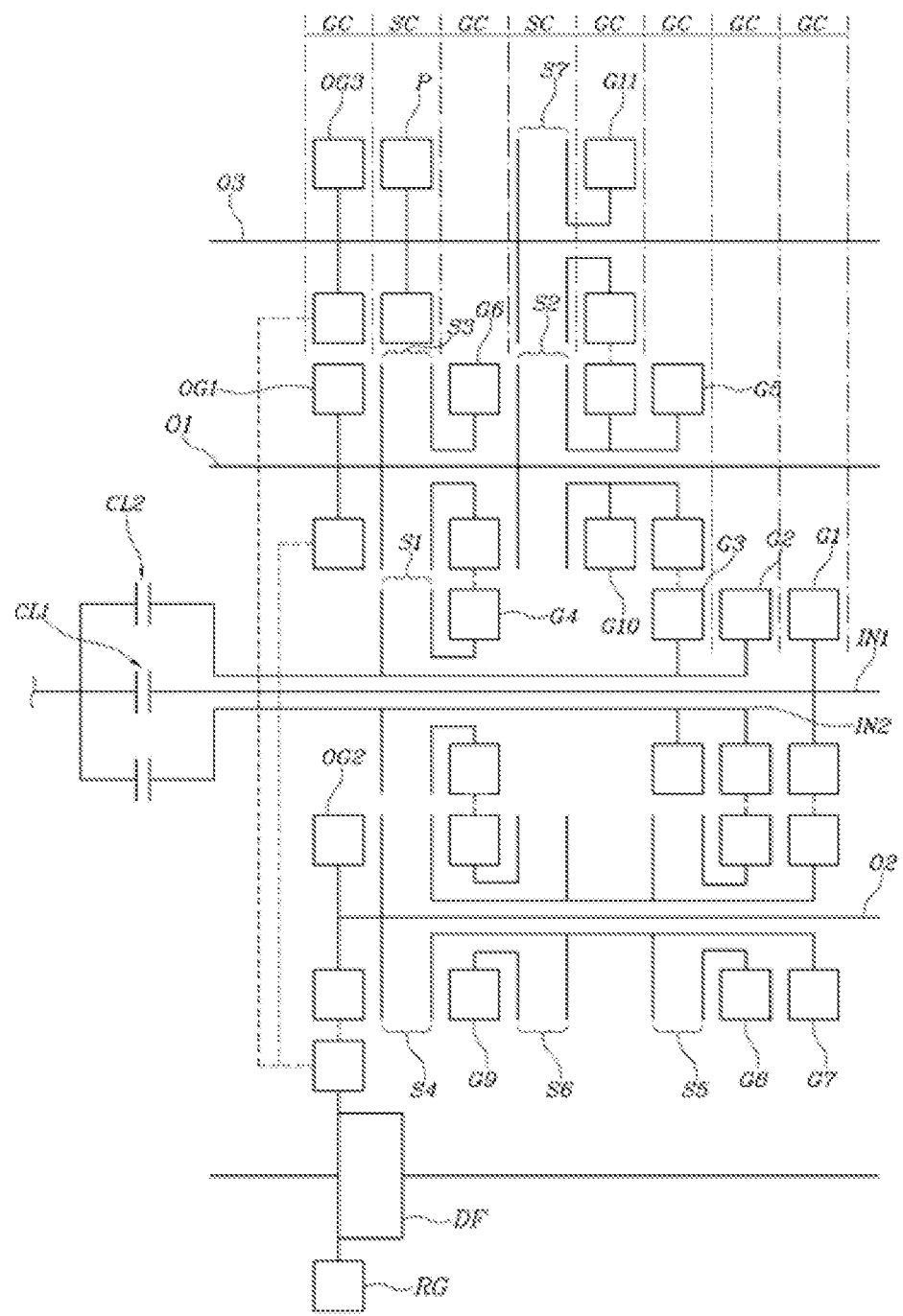
FIG. 12 is a diagram indicating a gear column and a sleeve column of the dual clutch transmission according to the various exemplary embodiments of the present invention.

The exemplary embodiments of the present invention as described above may be configured to implement all of the shifting stages having forward six stages and reverse one stage by having only a total of six gear columns GC, which are spaces in which the gears, which are engaged with each other vertically to the axial direction thereof, occupy along the axial direction thereof, and additionally having only a total of two sleeve columns SC, which are spaces in which the synchronizers occupy along the axial direction thereof, in addition to the spaces occupied by the gear columns GC along the axial direction thereof, implementing a relatively large number of shifting stages even while the whole length of the transmission is configured relatively shortly (see FIG. 12).

Here, the "gear column" refers to a space which is required to be secured in the transmission in consideration of the axial minimum length required for securing the strength of the level required by a portion where the gears are engaged to form the shifting stage, and the "sleeve column" refers to a space which is required to be secured in the transmission in consideration of the axial minimum length required for the sleeve of the synchronizer to connect or release two rotating bodies through the axial movement, and is to count only a portion which does not overlap the gear column GC.

Hereinafter, it will be described with reference to FIGS. 2 to 10 that the various exemplary embodiments of the present invention implements forward shifting stages having the first stage to the sixth stage and a reverse shifting stage.

Figure 2:
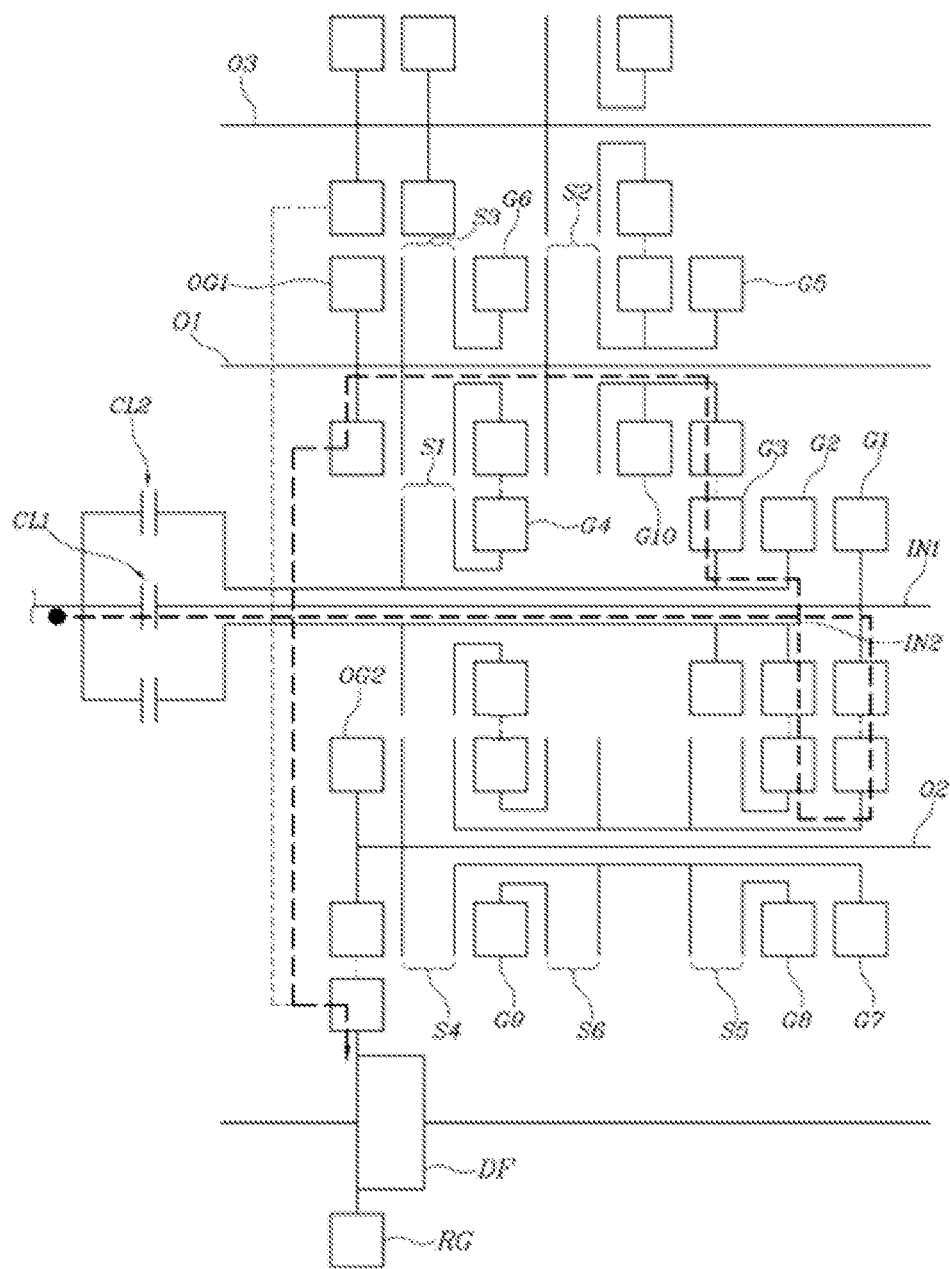
FIG. 2 is a diagram explaining that the transmission of FIG. 1 implements a first stage.

FIG. 2 illustrates that the first stage is implemented, and the power supplied to the first input shaft IN1 through the first clutch CL1 is transferred to the ring gear RG of the differential DF through the first gear G1, the seventh gear G7, the fifth synchronizer S5, the eighth gear G8, the second gear G2, the third gear G3, the fifth gear G5, the second synchronizer S2, the first output shaft O1, and the first output gear OG1 sequentially.

That is, a first stage gear ratio is implemented by combining various gears without having a separate first stage shift gear for implementing the first stage gear ratio.

Figure 3:
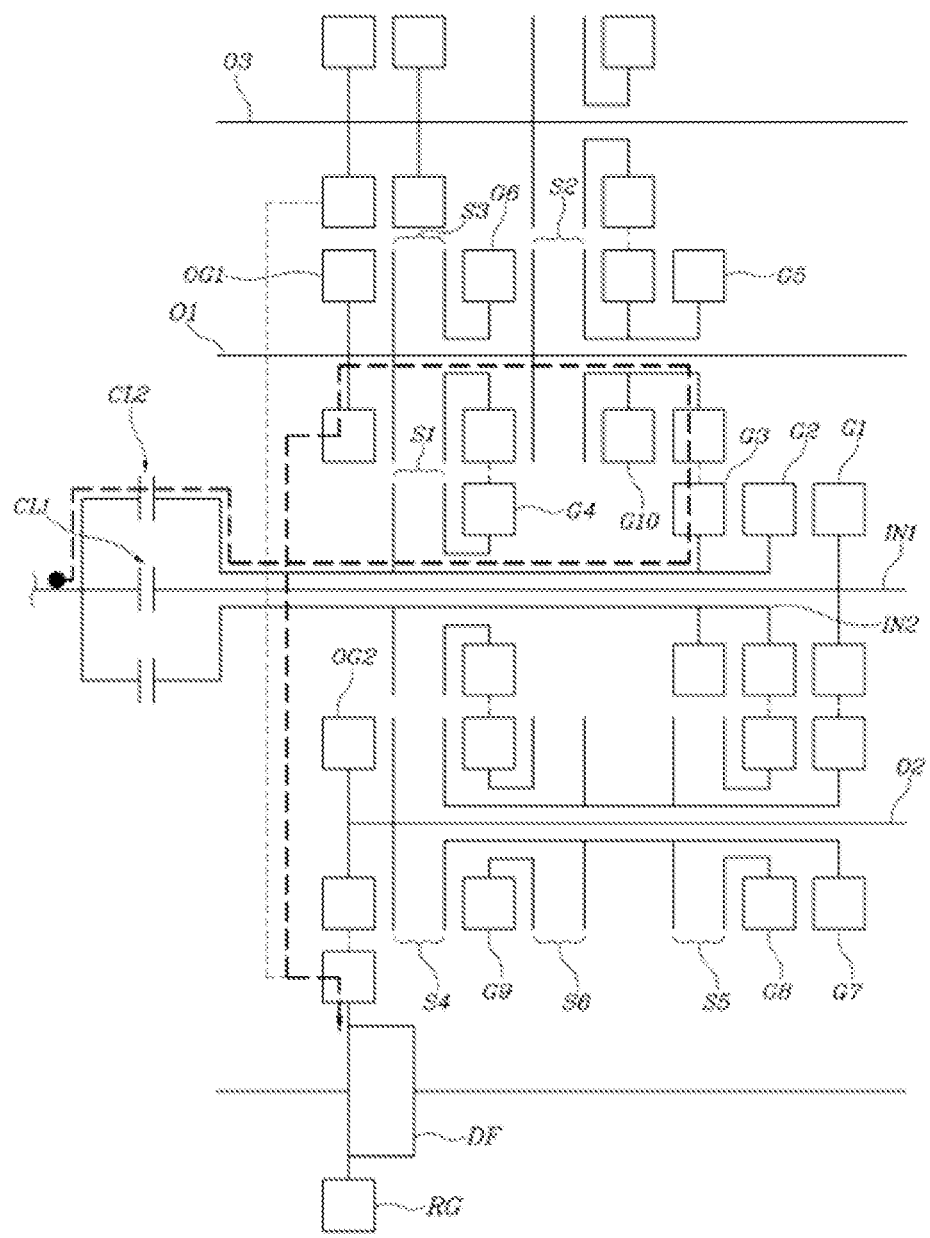
FIG. 3 is a diagram explaining that the transmission of FIG. 1 implements a second stage.

FIG. 3 illustrates that the second stage is implemented, and the shift from the first stage to the second stage is implemented by fastening the second clutch CL2 while releasing the first clutch CL1, and power is transferred to the second input shaft IN2 through the second clutch CL2, and then transferred to the differential DF through the third gear G3, the fifth gear G5, the second synchronizer S2, the first output shaft O1, and the first output gear OG1 sequentially.

Figure 4:
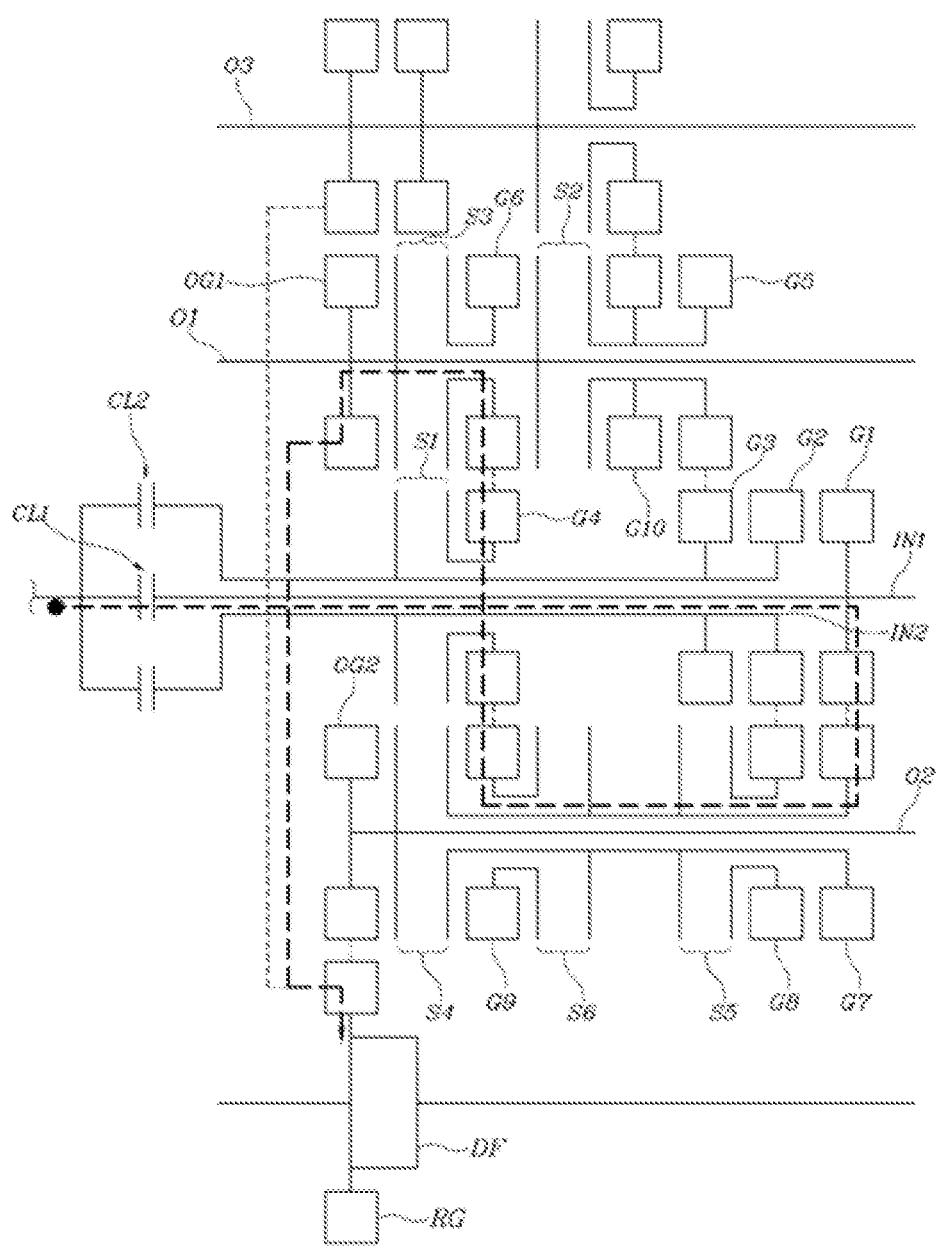
FIG. 4 is a diagram explaining that the transmission of FIG. 1 implements a third stage.

FIG. 4 illustrates that the third stage is implemented, and the shift from the second stage to the third stage is implemented by connecting the first clutch CL1 while releasing the second clutch CL2, in a state in which a third stage power path is configured by pre-engaging between the third synchronizer S3 and the sixth synchronizer S6.

The power transferred to the first input shaft IN1 is transferred to the differential DF through the first gear G1, the seventh gear G7, the sixth synchronizer S6, the ninth gear G9, the fourth gear G4, the sixth gear G6, and the third synchronizer S3 sequentially.

Figure 5:
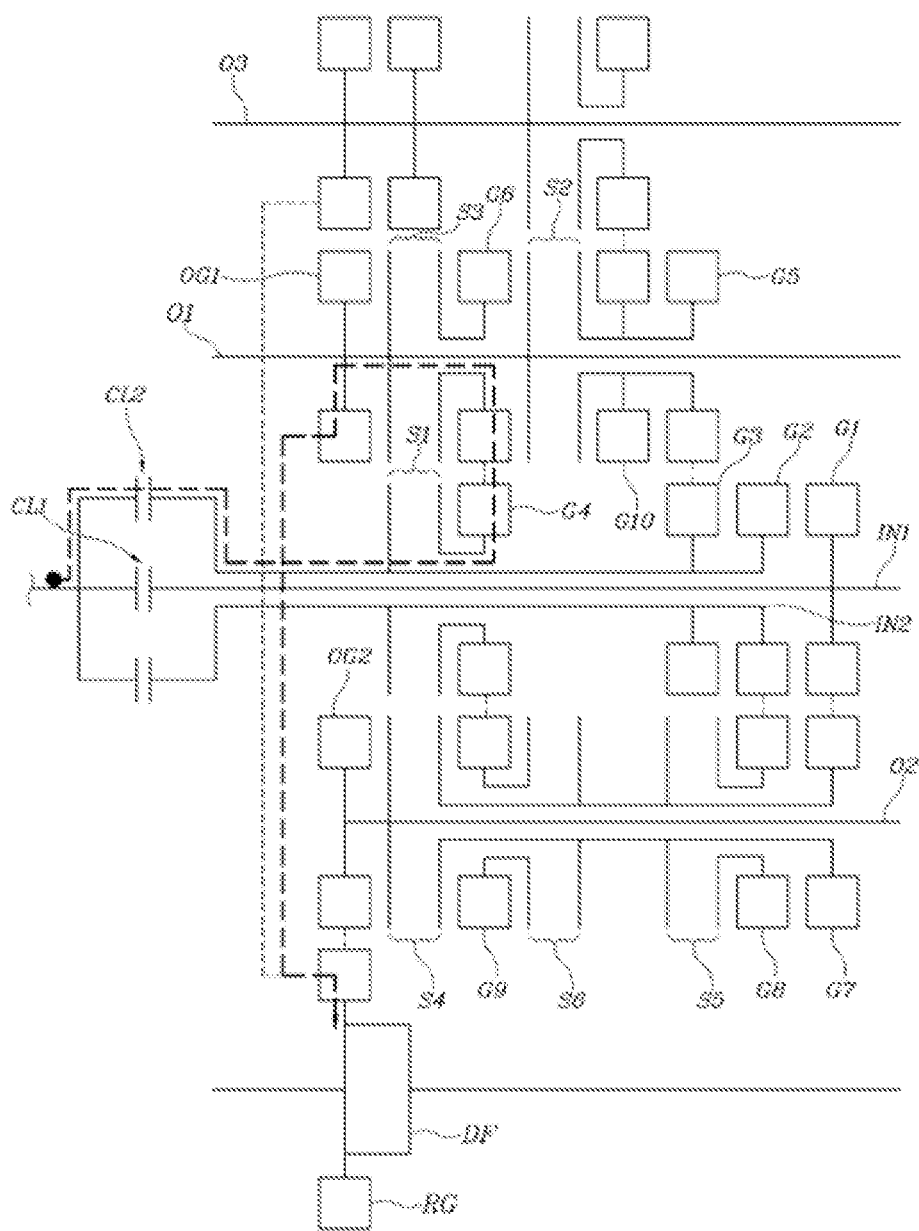
FIG. 5 is a diagram explaining that the transmission of FIG. 1 implements a fourth stage.

FIG. 5 illustrates that the fourth stage is implemented, and the fourth stage is implemented by transferring power to the second clutch, in a state in which the first synchronizer S1 and the third synchronizer S3 are fastened.

The power transferred from the second clutch to the second input shaft IN2 is transferred to the differential DF through the first synchronizer S1, the fourth gear G4, the sixth gear G6, the third synchronizer S3, and the first output shaft O1 sequentially.

Figure 6:
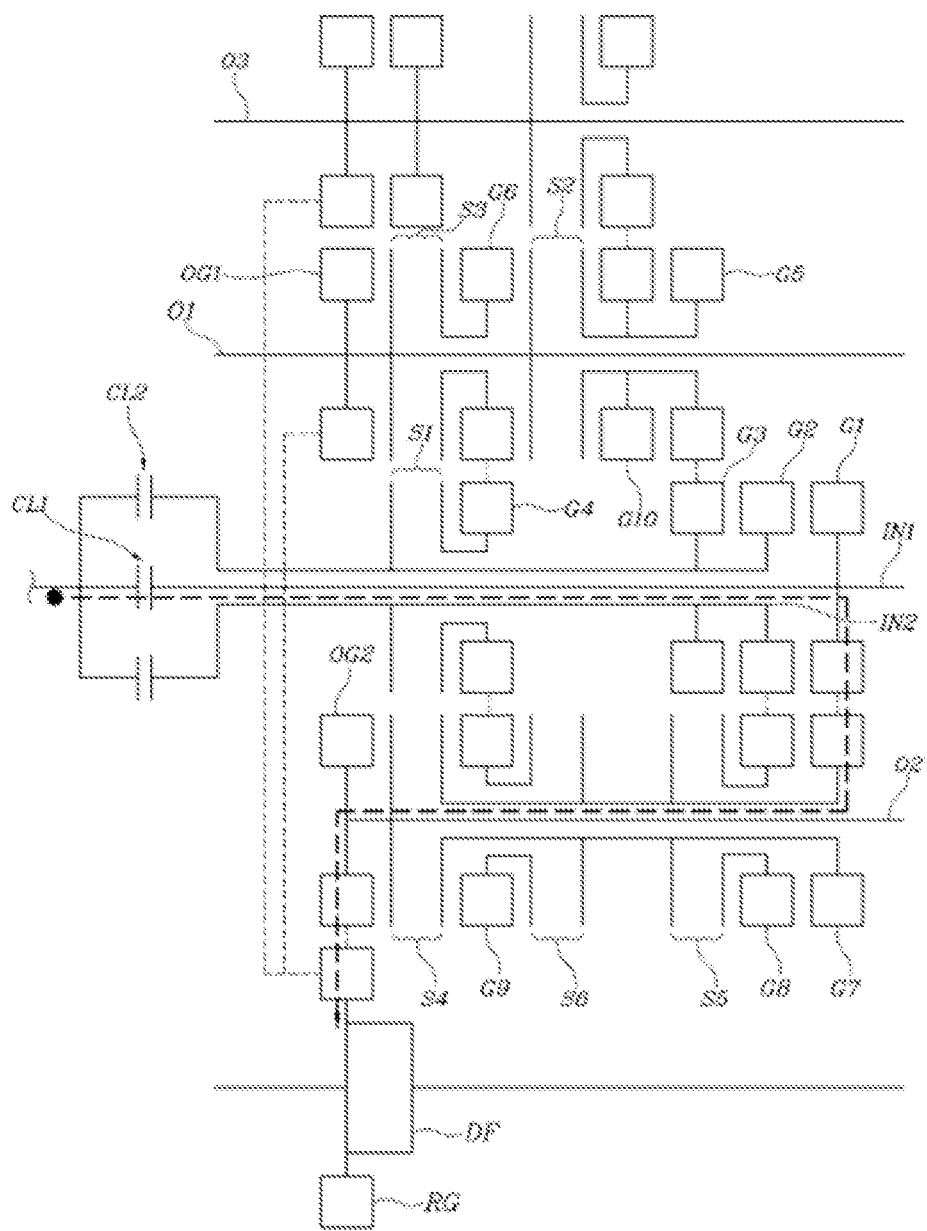
FIG. 6 is a diagram explaining that the transmission of FIG. 1 implements a fifth stage.

FIG. 6 illustrates that the fifth stage is implemented, and the shift from the fourth stage to the fifth stage is implemented by pre-engaging the fourth synchronizer S4, and fastening the first clutch CL1 while releasing the second clutch CL2.

The power transferred to the first input shaft IN1 is transferred to the differential DF through the first gear G1, the seventh gear G7, the fourth synchronizer S4, the second output shaft O2, and the second output gear OG2 sequentially.

Figure 7:
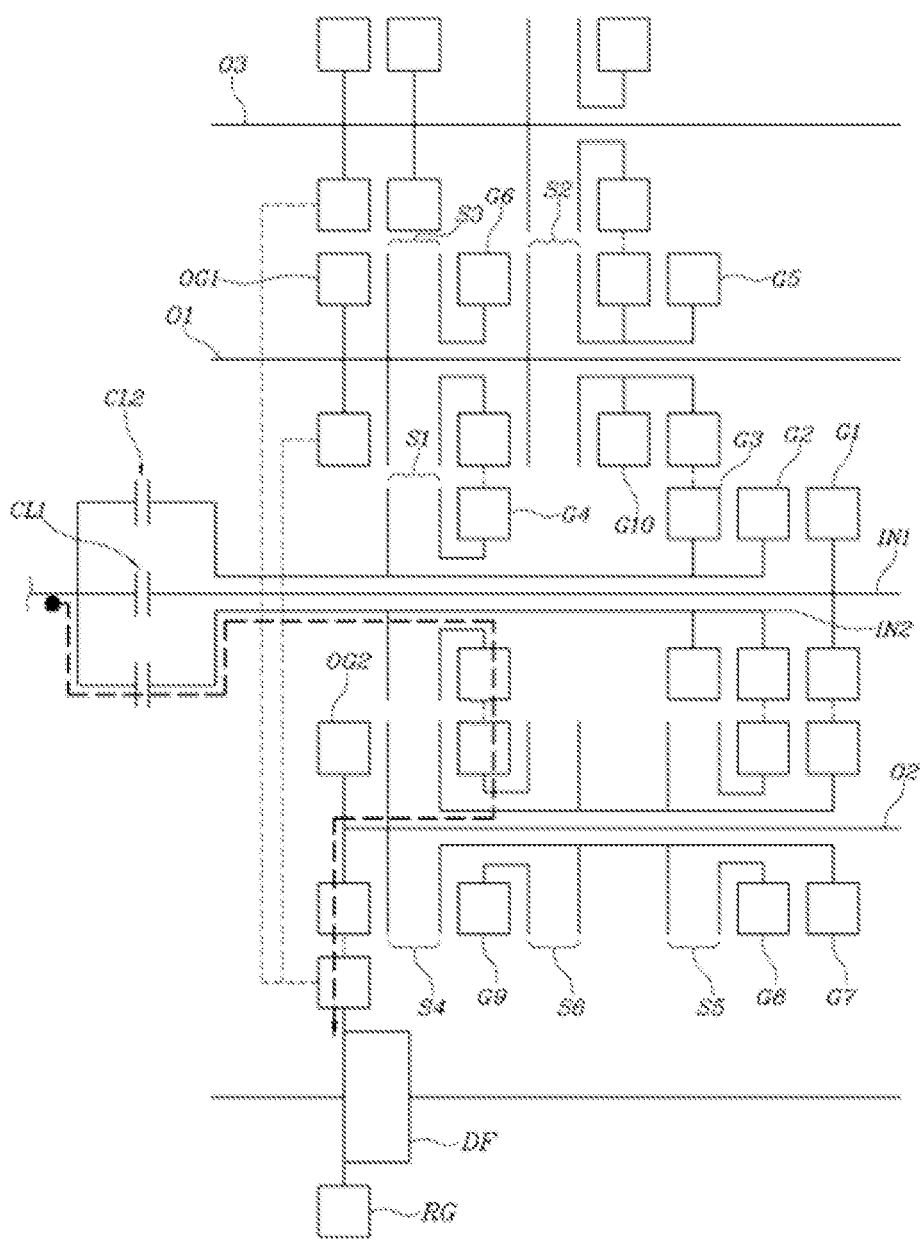
FIG. 7 is a diagram explaining that the transmission of FIG. 1 implements a sixth stage.

FIG. 7 illustrates that the sixth stage is implemented, and the shift from the fifth stage to the sixth stage is implemented by pre-engaging the first synchronizer S1, the fourth synchronizer S4, and the sixth synchronizer S6, releasing the first clutch CL1, and fastening the second clutch CL2.

The power transferred to the second input shaft IN2 is taken out to the differential DF through the first synchronizer S1, the fourth gear G4, the ninth gear G9, the sixth synchronizer S6, the fourth synchronizer S4, the second output shaft O2, and the second output gear OG2 sequentially.

Figure 8:
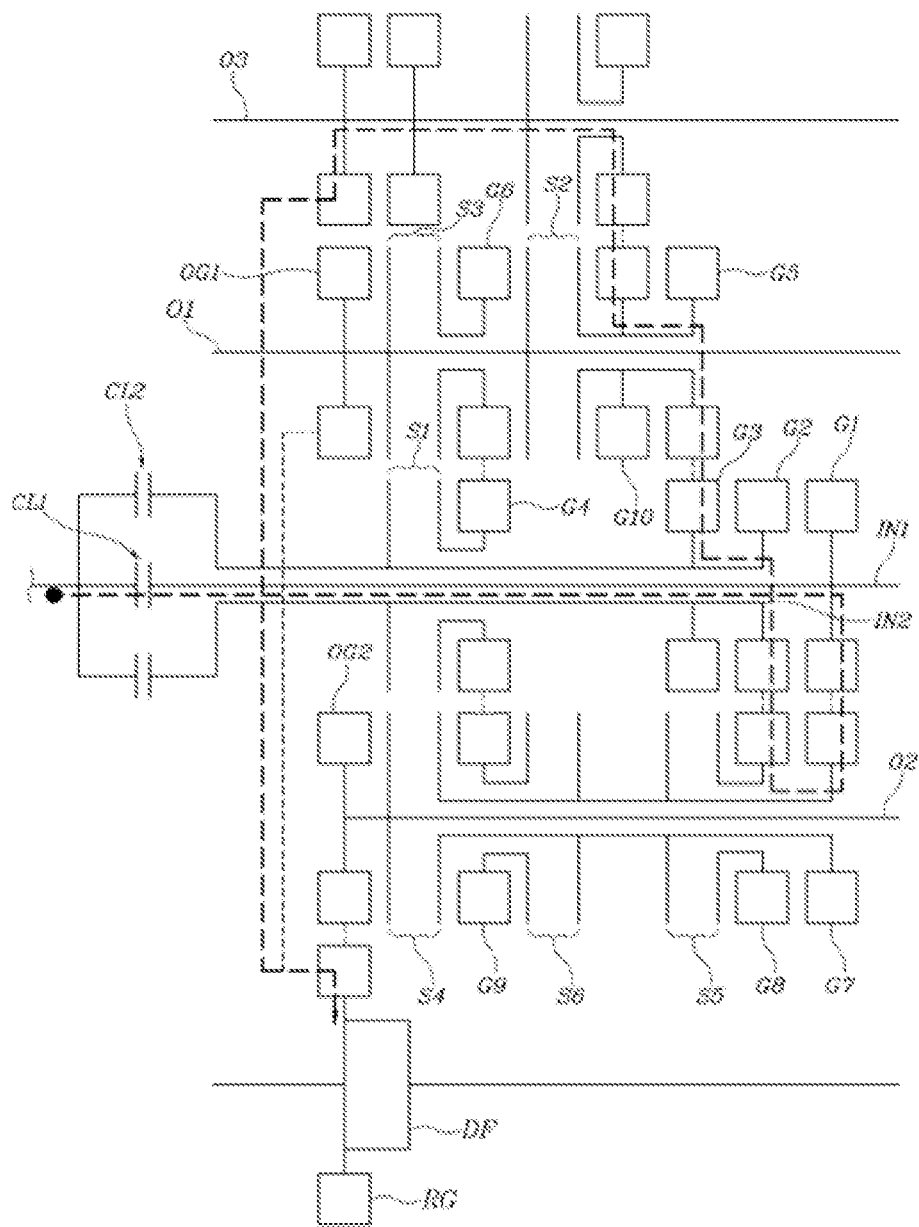
FIG. 8 is a diagram explaining that the transmission of FIG. 1 implements an R stage.

FIG. 8 illustrates that the R stage, which is the reverse stage, is implemented, and the power transferred to the first input shaft IN1 through the first clutch CL1 is transferred to the differential DF through the first gear G1, the seventh gear G7, the fifth synchronizer S5, the eighth gear G8, the second gear G2, the third gear G3, the fifth gear G5, the tenth gear G10, the eleventh gear G11, the seventh synchronizer S7, the third output shaft O3, and the third output gear OG3 sequentially, implementing the reverse.

When forming each of the shifting stages as described above, the fastening state of the clutch and each of the synchronizers may be summarized as illustrated in FIG. 9, and FIG. 10 illustrates the shift configured for power shift without power disconnection upon shift between the each shifting stage by dots.

For reference, FIG. 9 and FIG. 10 are applicable to both the various exemplary embodiments in FIG. 1 and the various exemplary embodiments in FIG. 11 of the present invention other than the portion of implementing the reverse stage.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A transmission comprising:
a first input shaft and a second input shaft which are concentrically mounted to each other and engaged to a power source;
a first output shaft and a second output shaft which are mounted parallel with the first input shaft, wherein the first output shaft includes a first output gear and the second output shaft includes a second output gear and the first and second output gears are engaged with a ring gear of a differential;
a first gear, rotation of which is constrained to the first input shaft;
a second gear and a third gear, rotations of which are constrained to the second input shaft;
a fourth gear, a rotation of which is selectively constrained to the second input shaft;
a fifth gear gear-engaged with the third gear, wherein a rotation of the fifth gear is selectively constrained to the first output shaft;
a sixth gear gear-engaged with the fourth gear, wherein a rotation of the sixth gear is selectively constrained to the first output shaft;
a seventh gear gear-engaged with the first gear, wherein a rotation of the seventh gear is selectively constrained to the second output shaft;
an eighth gear which is gear-engaged with the second gear, rotatably mounted on the second output shaft, and selectively connectable to the seventh gear; and
a ninth gear which is gear-engaged with the fourth gear, rotatably mounted on the second output shaft, and selectively connectable to the seventh gear.

2. The transmission according to claim 1,
wherein the second input shaft is formed of a hollow shaft surrounding the first input shaft, and
wherein the fourth gear, the third gear, the second gear and the first gear are mounted sequentially along an axial direction of the first input shaft from the power source.

3. The transmission according to claim 1, further including a hollow shaft concentrically mounted to the second output shaft,
wherein the first gear is fixedly connected to the first input shaft;
wherein the second gear and the third gear are fixedly connected to the second input shaft;
wherein the fourth gear is rotatably mounted on the second input shaft;
wherein the fifth gear is rotatably mounted on the first output shaft;
wherein the sixth gear is rotatably mounted on the first output shaft;
wherein the seventh gear is fixedly mounted on the hollow shaft,
wherein the eighth gear is rotatably mounted on the hollow shaft, and, and
wherein the ninth gear is rotatably mounted on the hollow shaft.

4. The transmission according to claim 3, further including a first synchronizer, wherein the second input shaft is provided with the first synchronizer which selectively constrains the rotation of the fourth gear to the second input shaft.

5. The transmission according to claim 4, further including a second synchronizer and a third synchronizer,
wherein the first output shaft is provided with the second synchronizer which selectively constrains the rotation of the fifth gear to the first output shaft, and the third synchronizer which selectively constrains the rotation of the sixth gear to the first output shaft, and
wherein the sixth gear is disposed between the second synchronizer and the third synchronizer.

6. The transmission according to claim 5, further including a fourth synchronizer, a fifth synchronizer and a sixth synchronizer, wherein the second output shaft is provided with the fourth synchronizer which selectively constrains the seventh gear to the second output shaft, wherein the fifth synchronizer which selectively connects the eighth gear to the seventh gear is mounted on the hollow shaft between the eighth gear and the ninth gear, and wherein the sixth synchronizer which selectively connects the ninth gear to the seventh gear is mounted on the hollow shaft between the fifth synchronizer and the ninth gear.

7. The transmission according to claim 6, wherein the eighth gear and the ninth gear are rotatably mounted to the hollow shaft which connects between the seventh gear and the fourth synchronizer.

8. The transmission according to claim 7, further including:

a third output shaft which is mounted parallel with the first input shaft, and has a third output gear gear-engaged with the ring gear of the differential, wherein a tenth gear fixedly connected to the fifth gear, is rotatably mounted on the first output shaft between the fifth gear and the second synchronizer, and wherein an eleventh gear is gear-engaged with the tenth gear and is rotatably mounted on the third output shaft, rotation of the eleventh gear being selectively constrained to the third output shaft.

9. The transmission according to claim 8, wherein the third output shaft is provided with a parking gear and a seventh synchronizer which selectively constrains the rotation of the eleventh gear to the third output shaft.

10. The transmission according to claim 9, wherein the third output shaft is provided with a third output gear gear-engaged with the ring gear of the differential.

11. The transmission according to claim 9, wherein the transmission is formed of:

six gear columns which are first spaces in which predetermined gears, which are engaged with each other vertically to an axial direction of the first input shaft among the first output gear, the second output gear, the first gear, the second gear, the third gear, the fourth gear, the fifth gear, the sixth gear, the seventh gear, the eighth gear, the ninth gear, the tenth gear and the eleventh gear occupy along the axial direction, and two sleeve columns which are second spaces in which predetermined synchronizers occupy along the axial direction among the first synchronizer, the second synchronizer, the third synchronizer, the fourth synchronizer, the fifth synchronizer and the sixth synchronizer, in addition to the first spaces in which the sixth gear columns occupy along the axial direction.

12. The transmission according to claim 11, wherein the six gear columns includes:

a first gear column including the first output gear and the second output gear;

a second gear column including the fourth gear, the sixth gear and the ninth gear;

a third gear column including the eleventh gear and the tenth gear;

a fourth gear column including the fifth gear and the third gear;

a fifth gear column including the second gear and the eighth gear;, and a sixth gear column including the first gear and the seventh gear, and wherein the two sleeve columns includes:

a first sleeve column including the first synchronizer and the fourth synchronizer; and a second sleeve column including the second synchronizer, the sixth synchronizer and the seventh synchronizer.

13. The transmission according to claim 12, wherein the first gear column, the first sleeve column, the second gear column, the second sleeve column, the third gear column, the fourth gear column, the fifth gear column, and the sixth gear column are aligned in series from the power source.

14. The transmission according to claim 11, wherein the transmission is configured to implement shifting stages having forward six stages and reverse one stage.

15. The transmission according to claim 1, wherein the second output shaft is provided with a parking gear.

16. The transmission according to claim 1, further including:

a first clutch configured for selectively connecting the power source to the first input shaft; and a second clutch configured for selectively connecting the power source to the second input shaft.

* * * * *